United States Patent
Gemein et al.

[11] 3,722,965
[45] Mar. 27, 1973

[54] RADIAL SLIDE BEARINGS CONSTRUCTED AS THREE-WEDGE BEARINGS, PREFERABLY FOR TURBOMACHINES

[75] Inventors: Rudolf Gemein, Duisburg; Gerold Holzer, Mulheim (Ruhr), both of Germany

[73] Assignee: Kraftwerk Union Aktiengesellschaft, Mulheim (Ruhr), Germany

[22] Filed: Jan. 21, 1972

[21] Appl. No.: 219,628

[30] Foreign Application Priority Data

Jan. 25, 1971 Germany.................P 21 03 239.3

[52] U.S. Cl...................................................308/122
[51] Int. Cl................................................F16c 17/16
[58] Field of Search...................308/141, 122, 9, 73

[56] References Cited

FOREIGN PATENTS OR APPLICATIONS 945,884  7/1956  Germany...............................308/73

Primary Examiner—Charles J. Myhre
Assistant Examiner—Frank Susko
Attorney—Arthur E. Winfond et al.

[57] ABSTRACT

Radial slide bearing in the form of a three wedge bearing includes a bearing shell formed of an upper and a lower longitudinal half shell, a bearing bushing mounted in the shell and formed with shaft-bearing surfaces on the inner periphery thereof, the bearing shell and bearing bushing being comprised of three radial wedge segments with respective sickle-shaped spaces distributed over the inner periphery for building up therein wedges of lubrication for lubricating a rotary shaft receivable in the bearing bushing, the sickle-shaped spaces each having a leading edge in direction of rotation of the shaft, oil inlet channels formed in the bearing shell and the bearing bushing and communicating with the respective spaces at the leading edges thereof, and oil outlet channels also formed in the bearing shell and the bearing bushing and communicating with the respective spaces at a location thereof downstream from the leading edges thereof, one of the three wedge segments being located at the top of the bearing shell and extending over the bearing surface at the upper half shell substantially concentrically to the vertical axial plane of the bearing shell, the upper wedge segment including an adjusting segment wherein the respective sickle-shaped space of the upper wedge segment is formed, the adjusting segment being adjustably mounted in the bearing shell for adjusting lubrication clearance between the bearing surface thereof and the shaft receivable in the bearing bushing so as to vary oil pressure forces exertable on the upper part of the shaft.

4 Claims, 8 Drawing Figures

Patented March 27, 1973 3,722,965

RADIAL SLIDE BEARINGS CONSTRUCTED AS THREE-WEDGE BEARINGS, PREFERABLY FOR TURBOMACHINES

The invention relates to a radial slide bearing constructed as a three-wedge bearing preferably for turbomachines, especially large capacity steam turbines, which includes a longitudinally divided bearing shell having bearing surfaces formed by a bearing bushing or a lubricating-metal drain. Wedge segments, which are distributed over the inner periphery of the bearing surfaces, are formed with sickle-shaped spaces, that build up the lubricating wedges with respect to the shaft, the sickle-shaped spaces having a leading edge in rotary direction of the shaft receivable in the bearing bushing, with which oil inlet channels are in communication, oil outlet channels being further connected to the sickle-shaped spaces.

Radial slide bearings of the aforedescribed construction are especially advantageous with respect to the lubrication of the sliding bearings, the attenuation of vibration amplitudes and stabilization of the shaft. The magnitude of the vibrating masses increases with increasing capacity or output of the steam turbines for which it is primarily applicable, and the laterally or upwardly directed steam forces increase as well, and tend to shift the shaft from its stable position. Furthermore, when a steam turbine plant is placed in operation, load-dependent and heat-dependent variations in play occurring in the bearing can cause an increase in the tendency of the shaft to vibrate.

It is accordingly an object of the invention to provide a radial slide bearing of the aforementioned type which avoids the foregoing difficulties and which, more specifically, stabilizes the shaft in a very simple manner even after the turbomachine has been placed in operation.

With the foregoing and other objects in view, there is provided, in accordance with the invention radial slide bearing in the form of a three wedge bearing comprising a bearing shell formed of an upper and a lower longitudinal half shell, a bearing bushing mounted in the shell and formed with shaft-bearing surfaces on the inner periphery thereof, the bearing shell and bearing bushing being comprised of three radial wedge segments with respective sickle-shaped spaces distributed over the inner periphery for building up therein wedges of lubrication for lubricating a rotary shaft receivable in the bearing bushing, the sickle-shaped spaces each having a leading edge in direction of rotation of the shaft, oil inlet channels formed in the bearing shell and the bearing bushing and communicating with the respective spaces at the leading edges thereof and oil outlet channels also formed in the bearing shell and the bearing bushing and communicating with the respective spaces at a location thereof downstream from the leading edges thereof, one of the three wedge segments being located at the top of the bearing shell and extending over the bearing surface at the upper half shell substantially concentrically to the vertical axial plane of the bearing shell, the upper wedge segment including an adjusting segment wherein the respective sickle-shaped space of the upper wedge segment is formed the adjusting segment being adjustably mounted in the bearing shell for adjusting lubrication clearance between the bearing surface thereof and the shaft receivable in the bearing bushing so as to vary oil pressure forces exertable on the upper part of the shaft.

Other features which are considered as characteristic for the invention are set forth in the appended claims.

Although the invention is illustrated and described herein as radial slide bearings, constructed as three-wedge bearings, preferably for turbomachines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
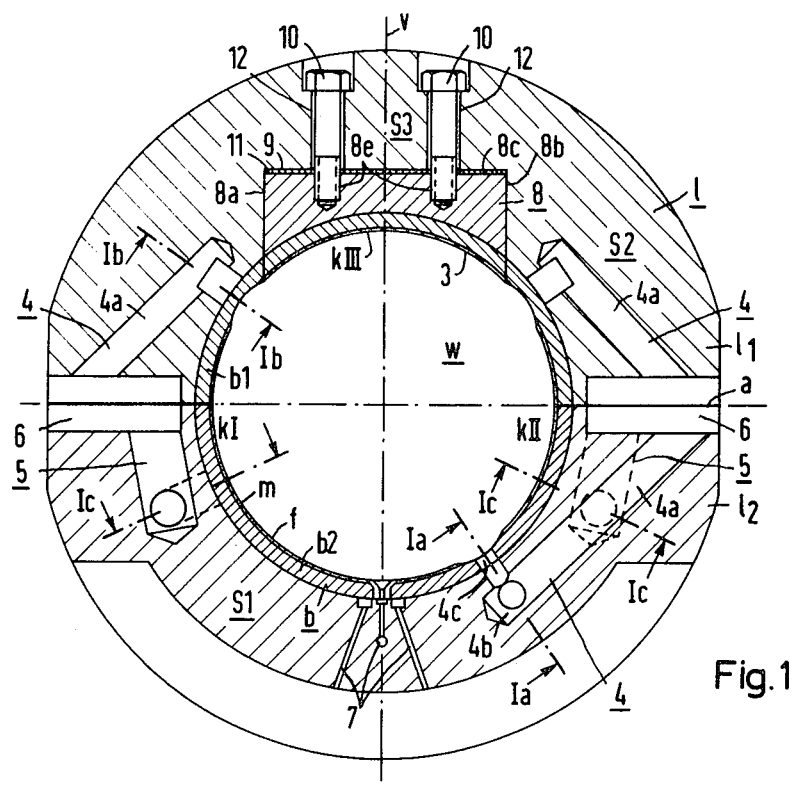
FIG. 1 is a cross-sectional view diametrical to the shaft of the radial slide bearing of the invention, shown in its basic construction.
Figure 2:
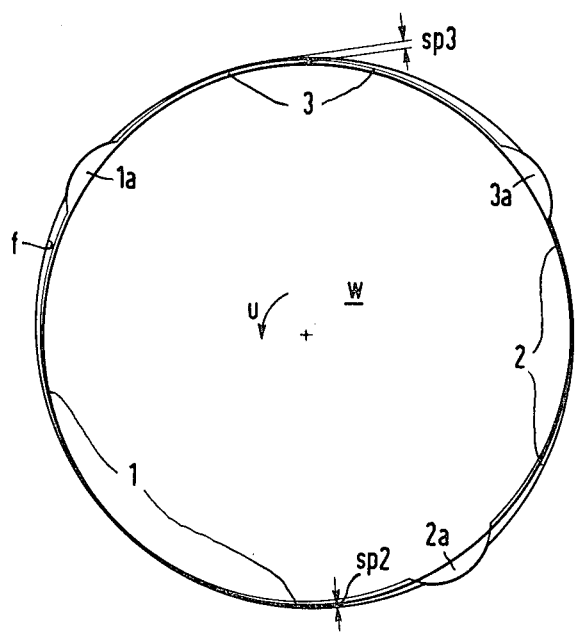
FIG. 2 is a diagrammatic view of the lubrication wedges at the inner periphery of the bearing surfaces or the outer periphery of the shaft, the lubrication wedges and oil pockets being much enlarged over the view thereof in FIG. 1 for greater clarity.
Figure 1A:
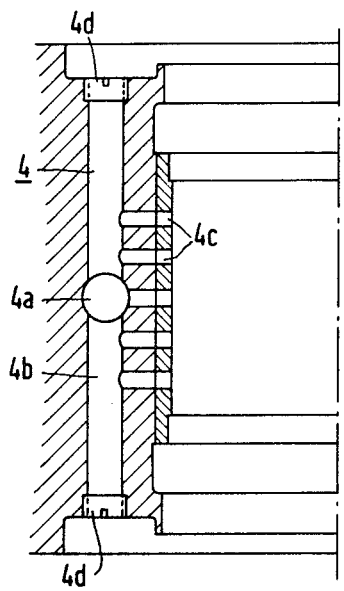
FIG. 1a is an enlarged sectional view of FIG. 1 taken along the line Ia—Ia in the direction of the arrows showing a detail of the oil inlet channel system of the lower half of the bearing shell of the invention.
Figure 1B:
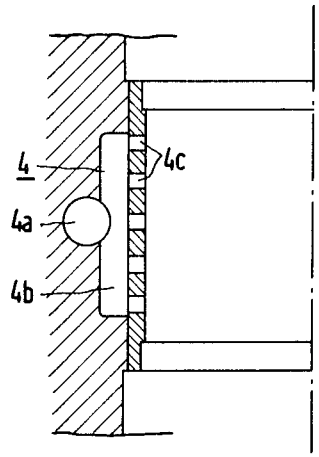
FIG. 1b is an enlarged sectional view of FIG. 1 taken along the line Ib—Ib in the direction of the arrows showing a detail of the oil inlet channel system of the upper half of the bearing shell of the invention.
Figure 1C:
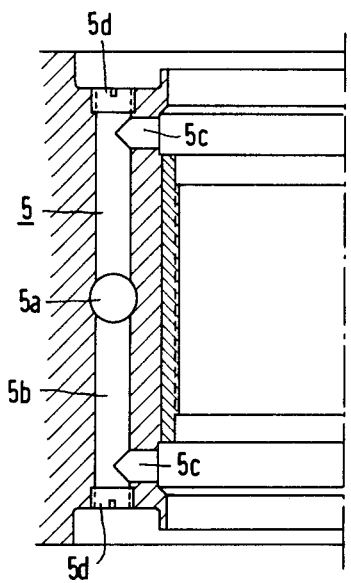
FIG. 1c is an enlarged sectional view of FIG. 1 taken along the line Ic—Ic in the direction of the arrows showing a detail of the oil outlet channel system.

Referring now to the drawings, and first particularly to FIG. 1 thereof, there is shown a radial slide bearing according to the invention, constructed as a three-wedge bearing. Lubrication wedges kI, kII and kIII to which the wedge segments S1, S2 and S3 of the bearing, generally designated by the reference numeral 1, belong are formed, during operation, between the outer peripheral surface of the shaft w and the bearing surfaces f of the bearing 1. The illustrated bearing 1 is preferably suited for turbomachines, particularly steam turbines of large capacity. The bearing 1 is formed of an axially or longitudinally divided bearing shell, the two halves $l_1$ and $l_2$ of the bearing shell being clamped together in the vicinity of the axial partial joint a of the bearing. The bearing surfaces f are formed by a bearing bushing b, that is similarly axially divided, into two shell halves b1 and b2 having an inner periphery provided with a white metal drain m. The thickness of the white metal drain m is in the order of magnitude of 1 mm, so that it is not recognizable from the reduced scale of the drawing. As aforementioned, the periphery of the bearing 1 can be visualized as being divided into three wedge segments S1 to S3, each of the wedge segments being associated with a sickel or lemon-shaped area 1, 2, or 3 (See FIG. 2), which serves to form the respective lubrication wedge relative to the shaft w. The sickle-shaped areas 1, 2 and 3 are provided at the beginning thereof, as viewed in the rotary direction u of the shaft w, with oil pockets 1a, 2a and 3a, which form the mouths of oil inlet channels denoted generally by the reference numeral 4. The special sickle shape of the spaces 1, 2 and 3 was created through precisely machining the white-metal drain m. The oil inlet channels 4 are made up of transversely directed cut-off channels 4a, axially extending distributor channels 4b, and individual radially extending channels 4c which are distributed over the axial length of the bearing surfaces f (see FIGS. 1a, 1b) and communicate with the pockets 1a to 3a. The inlet channel system for the lower bearing shell half $l_2$ shown in FIG. 1a differs somewhat from that for the upper bearing shell half $l_1$ shown in FIG. 1b, by the fact that the axial channel 4b is formed by a bore which is subsequently closed by stoppers 4d. According to FIG. 1b, the longitudinal channel 4b for the upper bearing shell half $l_1$ is formed of a milled pocket. FIG. 1c shows that the oil drainage from both axial ends of the bearing surfaces, is effected through channel lengths 5c which communicate with the axial canal 5b, which is, in turn, connected to the cut-off channel 5a. Thus, an intermixing of the oil arriving from oil wedges kI to kIII or flowing to those wedges occurs in the spaces 6 in the vicinity of the joint a. Pressure oil channels 7 (FIG. 1) are provided for a lifting and releasing device which lifts the shaft w away from the bearing surface f during start-up, as pressure oil is supplied, thereby avoiding mixed or dry friction.

Figure 3A:
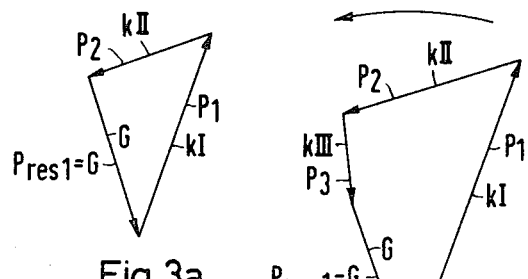
FIGS. 3a and 3b are vector diagrams of the oil pressure forces of the individual lubricating wedges, the oil pressure force $P_3$ of the lubricating wedge kIII being omitted in FIG. 3a and being included in FIG. 3b.
Figure 3B:
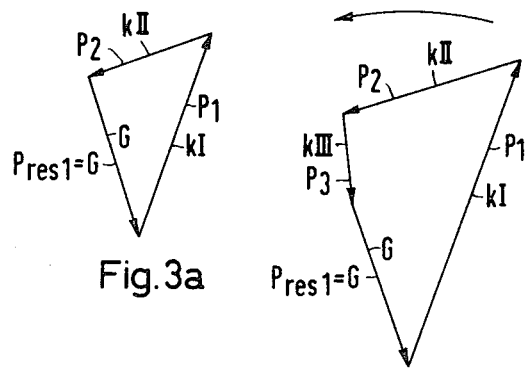

In accordance with the invention, of the wedge segments S1 to S3 of the bearing shell 1, there is provided an upper wedge segment S3 which spreads over the bearing surfaces f of the upper half $l_1$ of the bearing shell, substantially concentrically or symmetrically to the vertical axial plane v. The sickle-shaped space 3 of the wedge segment S3 is formed by an adjusting segment 8 which is adjustably mounted in the bearing shell $l_1$. By means of the adjusting segment 8, the oil pressure forces P3 (FIG. 3b) which act upon the upper part of the shaft, as viewed in FIG. 1, are variable by adjusting the oil gap, i.e., by adjusting the oil wedge kIII. Preferably, the adjusting segment 8 is constructed as a block-shaped arcuate body having, at the bottom thereof, the sickle-shaped space 3, as well as plane-parallel lateral faces 8a and 8b and a planar top surface 8c. The adjusting segment 8 is able to be fitted into a correspondingly shaped recess 9 formed in the upper bearing shell half $l_1$ wherein it is securable by screws 10. For adjusting purposes, spacers or shims 11 of variable thickness are insertable between the upper surface 8c of the adjusting segment 8 and the base of the recess 9. The fastening screws 10 extend through the upper bearing shell half $l_1$ through bores 12 formed therein, and are threadedly secured in threaded bores 8e formed in the adjusting segment 8. In the secured position thereof, the adjusting segment 8 is drawn against the base of the recess 9 or against the spacers or shims 11.

Figure 4:
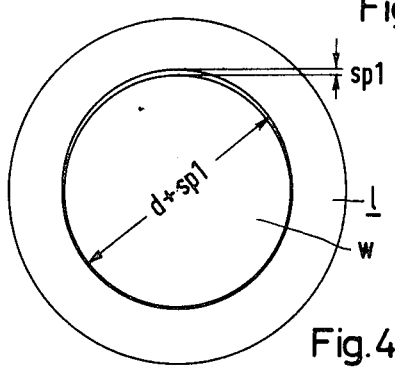
FIG. 4 is a diagrammatic view of the idle shaft in the bearing bore therefor, showing the bore clearance with respect to the shaft.

As shown in FIG. 4, the bore for the shaft w within the bearing 1 has a diameter d, which includes a slight clearance sp1 of a few tenths of a millimeter (mm), so that this clearance is produced during the inoperative or stationary condition of the shaft at the upper region of the shaft w. The spaces associated with the wedge segments 1 to 3 have a sickle or lemon shape as considered with respect to the shaft circle, a shape which has been found to be very satisfactory in practice. The right-hand and left-hand parts of the sickle-shaped spaces 1 and 2 (FIG. 2) are caused, due to the sickle shape, to be positioned somewhat below the shaft, providing an additional clearance dimension sp2 and thereby changing the clearance sp3 at the upper oil wedge kIII. The invention of this application makes it possible to shift or adjust the clearance for the oil wedge kIII an amount represented by the indicated dimension lines sp3 without changing the position and geometry of the wedge segments 1 and 2, which helps to create a balance with respect to the clearance sp1 and the clearance dimension sp2 and to provide the oil pressure forces in the wedge gap kIII with the desired magnitude. This is shown in greater detail in FIGS. 3a and 3b. By means of the aforementioned possibility of shifting or adjusting the adjusting segment 8 with shims or spacers 9, the vectorial composition of the three oil pressure forces P1, P2 and P3 can be varied. If the sickle-shaped space 3 in the vicinity of the oil wedge kIII were too large, virtually no or only limited oil pressure forces could be produced there, and the forces P1 of the oil wedge k1 and P2 of the oil wedge kII would provide the resultant oil pressure force $P_{res1} = G$ shown in FIG. 3a. By narrowing the gap in the vicinity of the oil wedge kIII through the insertion of suitable shims or spacers 9, an oil pressure force P3 would be produced which, for equal shaft weight G, would result in an oil pressure force composition corresponding to the vector diagram of FIG. 3b. According to the diagram of FIG. 3b, a downwardly directed oil force P3, depending upon the size of the gap sp3, becomes effective. Shaft stability can thereby be achieved even when upward-directed vapor forces prevail, which would have the tendency to move the shaft upwardly, substantially on a "gümbel" semicircle, which may result in low-frequency vibrations of great magnitude that are alien to the rotary speed, but which is avoided, however, by the invention of the instant application. It is particularly advantageous that the desired adjustment is capable of being effected relatively simply, whether during start-up or if an after-adjustment becomes necessary following a specific period in which the bearing surfaces of the lower wedges kI and kII have run in.

We claim:

1. Radial slide bearing in the form of a three wedge bearing comprising a bearing shell formed of an upper and a lower longitudinal half shell, a bearing bushing mounted in said shell and formed with shaft-bearing surfaces on the inner periphery thereof, said bearing shell and bearing bushing being comprised of three radial wedge segments with respective sickle-shaped spaces distributed over said inner periphery for building up therein wedges of lubrication for lubricating a rotary shaft receivable in said bearing bushing, said sickle-shaped spaces each having a leading edge in direction of rotation of the shaft, oil inlet channels formed in said bearing shell and said bearing bushing and communicating with the respective spaces at said leading edges thereof, and oil outlet channels also formed in said bearing shell and said bearing bushing and communicating with the respective spaces at a location thereof downstream from said leading edges thereof, one of said three wedge segments being located at the top of said bearing shell and extending over the bearing surface at the upper half shell substantially concentrically to the vertical axial plane of said bearing shell, said upper wedge segment including an adjusting segment wherein the respective sickle-shaped space of said upper wedge segment is formed, said adjusting segment being adjustably mounted in said bearing shell for adjusting lubrication clearance between the bearing surface thereof and the shaft receivable in said bearing bushing so as to vary oil pressure forces exertable on the upper part of the shaft.

2. Radial slide bearing according to claim 1 wherein said adjusting segment is a block-shaped arcuate member having said sickle-shaped space at the bottom thereof, parallel planar lateral faces, and a planar upper surface, said adjusting segment being fitted in a correspondingly shaped recess formed in said upper half shell and securable therein, and including spacer means of variable thickness insertable between the upper surface of said adjusting segment and the base of said recess.

3. Radial slide bearing according to claim 2 including fastening means extending through said upper half shell and fastenable to said adjusting segment for firmly tensioning said adjusting segment against said spacer means.

4. Radial slide bearing according to claim 3 wherein said fastening means comprise fastening screws threadedly engageable in threaded bores formed in said adjusting segment.

* * * * *